United States Patent [19]

Stephan

[11] Patent Number: 5,785,202

[45] Date of Patent: *Jul. 28, 1998

[54] STOWAGE CONTAINER FOR THE USE IN AIRCRAFT

[75] Inventor: Walter A. Stephan, St. Martin/Innkreis, Austria

[73] Assignee: Fischer Advanced Composite Components GmbH, Ried im Innkreis, Austria

[*] Notice: This patent issued on a continued prosecution application filed under 37 CFR 1.53(d), and is subject to the twenty year patent term provisions of 35 U.S.C. 154(a)(2).

[21] Appl. No.: 520,982

[22] Filed: Aug. 28, 1995

Related U.S. Application Data

[63] Continuation-in-part of Ser. No. 497,314, Jun. 30, 1995, which is a continuation-in-part of Ser. No. 23,898, Feb. 19, 1993, abandoned.

[30] Foreign Application Priority Data

Feb. 20, 1992 [AT] Austria ............................. A 312/92

[51] Int. Cl.$^6$ .................................................. B65D 90/02
[52] U.S. Cl. ............................ 220/455; 220/445; 220/622
[58] Field of Search ............................ 244/118.1; 220/469, 220/467, 445, 6, 4.29, 617, 622, 454, 457, 455, 4.33, 4.28; 217/17, 65

[56] References Cited

U.S. PATENT DOCUMENTS

| | | | |
|---|---|---|---|
| 1,348,354 | 8/1920 | Garnett | 220/622 |
| 2,041,357 | 5/1936 | Kraft | 156/228 X |
| 2,758,739 | 8/1956 | Burkholder | |
| 2,849,758 | 9/1958 | Plumley et al. | 217/17 |
| 3,142,406 | 7/1964 | Kantor | 220/469 |
| 3,148,103 | 9/1964 | Gallagher | 156/224 |
| 3,801,402 | 4/1974 | Suter | 156/224 X |
| 3,913,996 | 10/1975 | Benford | 220/467 |
| 4,010,865 | 3/1977 | Wilgus | 220/6 |
| 4,019,674 | 4/1977 | Ikelheimer et al. | 229/23 R |
| 4,266,670 | 5/1981 | Mykleby | 220/6 |
| 4,643,314 | 2/1987 | Kidd | 220/6 |
| 4,683,018 | 7/1987 | Sutcliffe et al. | 156/245 X |

(List continued on next page.)

FOREIGN PATENT DOCUMENTS

| | | |
|---|---|---|
| A-0 271 118 | 6/1988 | European Pat. Off. |
| A-0 293 320 | 11/1988 | European Pat. Off. |
| A-2 563 153 | 10/1985 | France . |
| A-2 588 575 | 4/1987 | France . |
| A-2 646 247 | 12/1977 | Germany . |
| A-3 537 402 | 4/1986 | Germany . |

Primary Examiner—Stephen J. Castellano
Attorney, Agent, or Firm—Ladas & Parry

[57] ABSTRACT

A stowage container for the use in aircraft, for example as an overhead stowage compartment or a trolley, comprises a bottom member A, a top member D, at least two side wall members B, C, and two plane end wall members 1. Said members are essentially rigid and plane. Additionally an essentially rigid closure flap member 3 may be provided. All said members are assembled together and together define the stowage space of the container. The end wall members 1 are made of injection molded parts, while a cured composite component 2 forms in one single piece the bottom member, the top member and the side wall members and is manufactured in sandwich construction of prepregs 6 of fiber reinforced thermosettings. Said component comprises regions of honeycomb construction material 7 interposed between at least two layers of prepregs, which regions of honeycomb construction material are somewhat spaced apart. Instead of a plane bottom member, top member and side wall members there can be provided a cured composite component 2 formed as an essentially rigid U-shaped surround member. In another modification of the construction of the stowage container the plane end wall members 1 may also be part of the cured composite component 2 in any of its embodiments. In this case, all wall members with the exeption of the closure flap member 3 are made in one single piece.

50 Claims, 9 Drawing Sheets

U.S. PATENT DOCUMENTS

| | | | |
|---|---|---|---|
| 4,690,851 | 9/1987 | Auduc et al. . | |
| 4,700,862 | 10/1987 | Carter et al. | 220/6 |
| 4,712,710 | 12/1987 | Freeman et al. . | |
| 4,781,243 | 11/1988 | DeVogel et al. . | |
| 4,793,727 | 12/1988 | Schmaling . | |
| 4,838,418 | 6/1989 | Teixeira | 220/457 |
| 4,948,039 | 8/1990 | Amatangelo | 220/445 |
| 4,948,806 | 8/1990 | Okabe et al. | 156/228 X |
| 5,108,048 | 4/1992 | Chang | 244/118.1 |
| 5,133,476 | 7/1992 | Schutz | 220/622 |

STOWAGE CONTAINER FOR THE USE IN AIRCRAFT

CROSS REFERENCE TO RELATED APPLICATIONS

This application is a continuation-in-part application of co-pending U.S. patent application Ser. No. 08/497,314, filed on Jun. 30, 1995, which is a continuation-in-part of U.S. patent application Ser. No. 08/023,898, filed on Feb. 19, 1993, now abandoned.

BACKGROUND OF THE INVENTION AND PRIOR ART

The invention relates to a stowage container for the use in aircraft, comprising a bottom member, a top member, at least two side wall members, and two plane end wall members, said members being essentially rigid and flat, and an essentially rigid closure flap member, all said members being assembled together and together defining the stowage space of the container, the end wall members being made of injection molded parts.

The invention furthermore relates to a stowage container comprising an essentially rigid U-shaped surround member, two plane end wall members and a closure flap member, said members being assembled together and together defining the stowage space of the container, the end wall members being made of injection molded parts.

In U.S. Pat. No. 4,019,674 a construction is described inter alia in the context of containers, in which a component forming the surround as well as a closure flap is connected to plane end walls. The individual components are pre-manufactured separately and are subsequently interconnected. Polyehtylene or polystyrene, both of which are thermoplastic materials, are for example disclosed as material for the end walls, and the component forming the surround may inter alia be composed of a fibre panel, i. e. a fibre reinforced component. However, in the aforesaid an application of the described construction in the aviation industry is in no way contemplated for which reason no mention is made as to how the therefore required strengths may be attained with the simultaneous attainment of a light construction. This applies particularly for the component forming the surround, in relation to which no indication is given by the aforesaid patent specification as to how it can be constructed lightweight and yet with adequate rigidity for employment in aviation technology.

In the case of the suitcase described in DE-OS 26 46 247 any component forming the surround may likewise be composed of plastics and be connected to end walls of polystyrene, i. e. once again a thermoplastic material. In that patent specification as well no use of the container described therein is contemplated in the context of aviation industry for which reason no measures for the attainment of the weight and strength parameters required in that context are described or even rendered obvious.

A container structure for a refrigeration apparatus is disclosed in the U.S. Pat. No. 3,913,996. Although this stowage container comprises components made from plastics material again no use in aviation industry is contemplated and no special measures or construction details are described or even made obvious for attaining a very strong but lightweight construction. Said patent specifications moreover only propose the use of thermoplastic material as do all the other aforementioned publications.

The use of fibre-based fabrics for construction of articles for fitting out the interior of aircraft is known, e. g. from the U.S. Pat. No. 4,690,851, and so is the use of honeycomb construction material, e. g. from U.S. Pat. No. 4,781,243 or FR-PS 2 563 153. But in this patent specifications no mention is made which special measures or construction features must be taken for the use of such fabrics or honeycomb material in light but very strong stowage containers which can be used in aviation industry attaining the required parameters for said use.

So-called overhead stowage compartments are used for example in modern aircraft for the storage of the hand baggage of passengers during the flight. Due to the inertial load applied to the aircraft body during the starting and landing phase or during flights and in emergency situations and the weight of the objects stored in such storage spaces, these overhead storage compartments are subjected to high mechanical stresses. These compartments are accordingly manufactured nowadays mainly from modern fibre composite materials, mainly glass fibre reinforced materials, recently also carbon fibre reinforced materials. The same considerations apply to the trollies used for storing for example the meals for the passengers on board of the aircraft. In principle two different constructions are employed:

The components are either manufactured from plane sandwich components which are assembled by jointing means as known from furniture manufacture to form the stowage container (the panels are cut to size, maybe folded, interconnected by separate elements). Such components for given weights per surface area of the sandwich panels are invariably rendered heavier by the connecting elements. The process is suitable for automatic performance and the elements of the baggage deposit cabinets can readily be standardised. High production reliability is afforded by very accurately defined simple production steps.

According to a second conventional construction all of the components, i. e. the top and bottom wall members, the side wall members, the end wall members, are made from cured plastics semi-manufactured components such as for example plastics prepregs and lightweight cores. Because of the lack of connecting elements, involving the need to design each of the components to be connected for simple safety, the components according to this second manner are substantially lighter—a decisive advantage in the aviation industry. However, the process reliability is low and defects arising in the production procedure result in expensive after-treatment costs and an increase in the weight of the components because of necessary reinforcing and connecting elements for the defective parts of the container.

The aforesaid advantage is also of special importance in the context of the so called trollies, i.e. stowage containers which preferably can travel on casters for the storage of meals or the like which are to be made available during the flight. Reduced weight without loss of strength properties implies a possible increase of the useful load whilst retaining the capability to resist mechanical loads as may arise. As regards the manufacture of the trollies the facts mentioned in connection with the overhead baggage compartments apply.

In addition to the more labour intensive assembly of the containers and the need for additional connecting components the risk exists that the aforementioned containers may suffer damage along the connecting regions due to the fine vibrations arising in flight. Particularly in the event of an emergency landing where the stowage containers must stand up to nine times gravitational force this can endanger the passengers or crew members.

OBJECTS OF THE INVENTION

Accordingly it was an object of the invention to design a stowage container of the types referred to in the introduction

3 in such a manner that in spite of simple manufacture and low inherent weight it is adapted to resist reliably the high mechanical loads arising during normal flight and in emergencies and that it avoids all the abovementioned drawbacks.

SUMMARY OF THE INVENTION

For attaining the aforesaid object a stowage container for the use in aircraft—for example as an overhead stowage compartment or as trolley—is provided, comprising a bottom member, a top member, at least two side wall members, and two plane end wall members, said members being essentially rigid and flat, and an essentially rigid closure flap member, all said members being assembled together and together defining the stowage space of the container, the end wall members being made of injection molded parts, a cured composite component forming in one single piece the bottom member, the top member and the side wall members and being manufactured in sandwich construction of prepregs of fibre reinforced thermosettings, said component comprising regions of honeycomb construction material interposed between at least two layers of prepregs, which regions of honeycomb construction material are somewhat spaced apart. According to a similar embodiment an essentially rigid U-shaped surround member, two plane end wall members and a closure flap member can be provided, said members being also assembled together and together defining the stowage space of the container, wherein the rigid U-shaped surround member is manufactured in sandwich construction as described above.

In this construction mode the composite component provides the required mechanical strength combined with a low weight necessary for the use in aviation industry, whilst the combination with the separate plane end wall members, which can for example be made of thermoplastic material, ensures a simple manufacture thereof by conventional techniques and an easy but reliable interconnection of the individual components.

According to another embodiment of the present invention a stowage container for the use in aircraft, constituting an overhead stowage compartment or a trolley, is provided comprising a bottom member, a top member, at least two side wall members, and two plane end wall members, said members being essentially rigid and flat, and an essentially rigid closure flap member, all said members being assembled together and together defining the stowage space of the container, a cured composite component forming in one single piece the bottom member, the top member, the side wall members and the two plane end wall members and being manufactured in sandwich construction of prepregs of fibre reinforced thermosettings comprising regions of honeycomb construction material interposed between at least two layers of prepregs, which regions of honeycomb construction material are somewhat spaced apart. In this construction mode the required strength is maintained at least at the same level as for the before described embodiments while due to the single-piece construction of all wall members with exeption of the closure flap member a very reliable and rigid container is provided. Furthermore the number of connecting elements can be considerably reduced or said connecting elements even totally avoided, whereby the weight is further reduced and the total strength to weight relation is even better than in the first embodiments.

The same effects and advantages are attained in an embodiment comprising an essentially rigid U-shaped surround member, two plane end wall members and a closure

4 flap member, said members being assembled together and together defining the stowage space of the container, a single cured composite component forming the surround member and the two plane end wall members and being manufactured in sandwich construction of prepregs of fibre reinforced thermosettings Preferably the composite component is folded—or bent in the case of the U-shaped surround member—to form all of the side wall members of the container.

To attain a very strong construction the composite component is made of glass fiber or carbon fibre reinforced thermosettings.

For a simple manufacture of the ready-to-use container the closure flap member is fitted to the composite component by means of hinges, giving a reliable interconnection of the component and the flap member. Said closure flap member can preferably be an injection molded part, preferably made of thermoplastic material, or a die cast part, both being simple in manufacture.

For giving to the container additional mechanical strength at least one intermediate plane wall member of injection molded parts, preferably made of thermoplastic material, between the two plane end wall members may be provided.

BRIEF DESCRIPTION OF THE DRAWINGS

In the following description four stowage containers are to be further explained in more detail with reference to the accompanying drawings. The latter show in FIG. 1 a diagrammatic view of an overhead stowage compartment in an aircraft body.

DESCRIPTION OF SPECIFIC EMBODIMENTS

The following is to be read against the background of the above general description of the invention.

Figure 1:
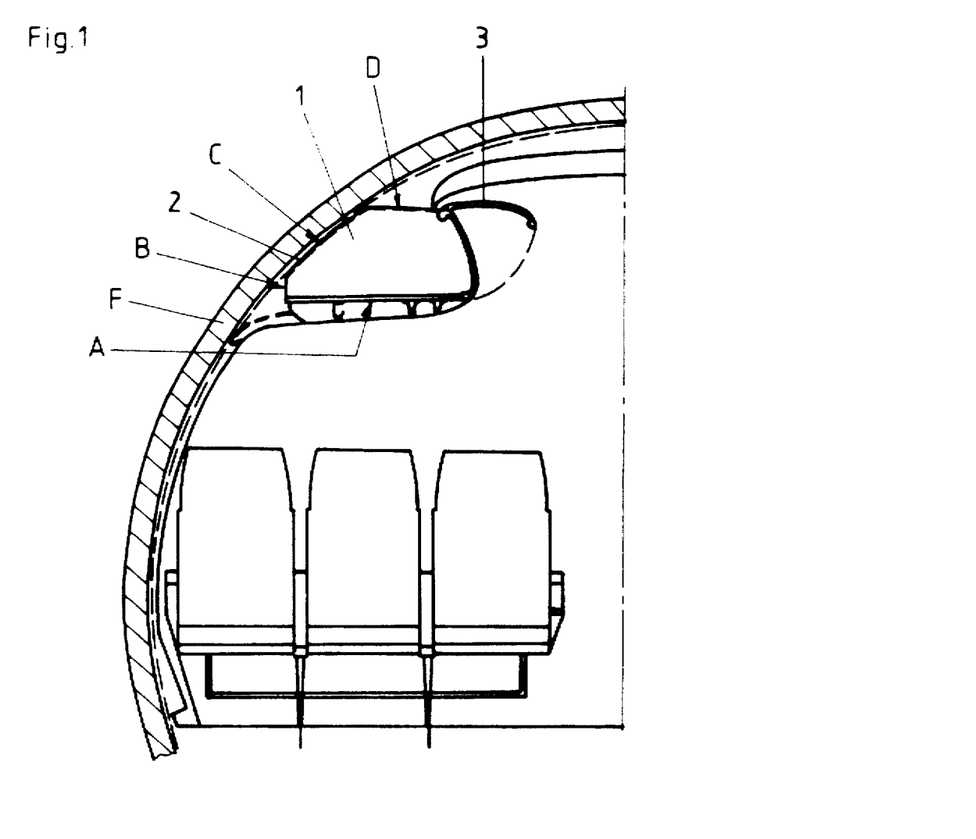

FIG. 1 represents, as an example for a plastics container constructed and manufactured in accordance with the invention, an overhead baggage compartment for aircraft. The baggage compartment fixed to the inside of the walls F of the aircraft body comprises plane end walls 1 and a simply or multiply bent or folded component 2 which forms by way of its side A the bottom, its sides B and C the rear wall and its side D the upper region of the baggage compartment. The component 2 may advantageously be provided with openings 2' (see FIG. 5a) which can be closed by flaps, through which the region between the inner wall F of the aircraft body and rear wall of the baggage compartment and the electrical or hydraulic lines accommodated therein are rendered accessible for maintenance and repair purposes.

On that side which faces the passenger space the baggage compartment can be closed by a closure flap 3 which may be of arcuate or sharply bent configuration. Optionally an intermediate wall (not illustrated) can be provided between the respective end walls 1 of a baggage compartment.

Figure 2:
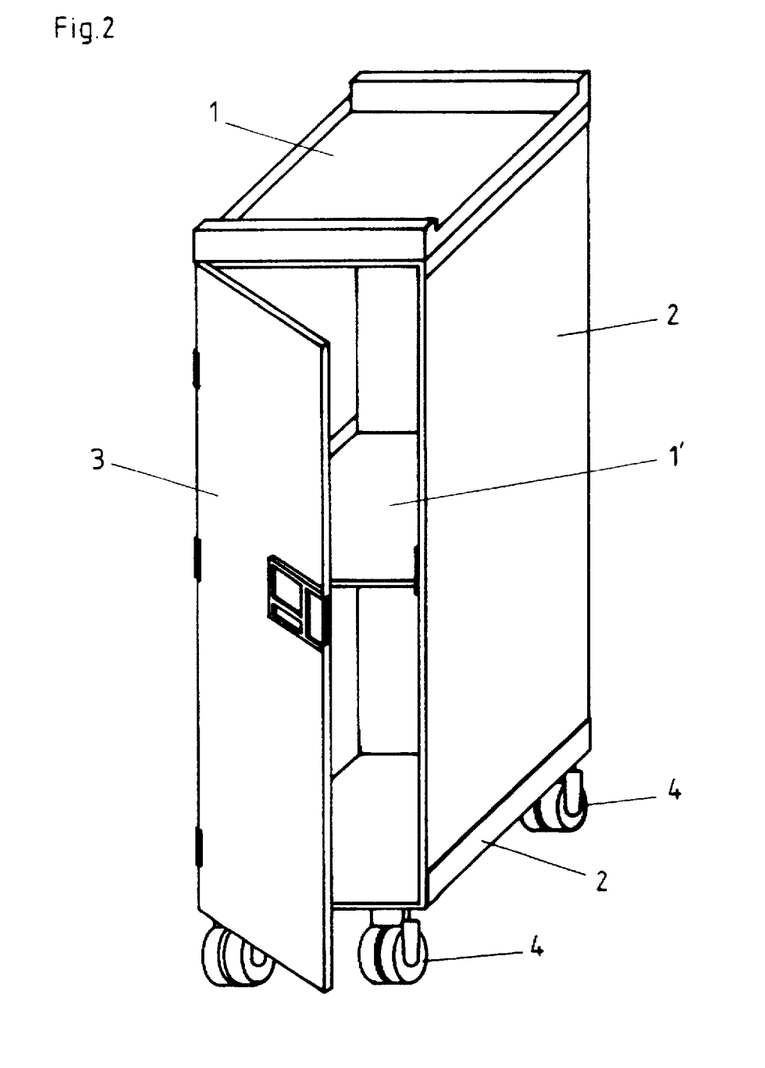
FIG. 2 a trolley.

As a second example for a plastics container constructed and manufactured in accordance with the invention, a so-called trolley is illustrated in FIG. 2. This container serves for example to accommodate the meals for flight passengers on trays and to take these onboard where they are kept for use, whereafter the empty trays are again accommodated and in turn are taken offboard. A trolley as well comprises plane walls 1 which in this case represent the bottom and upper side, a multiply folded component 2 forming three of the four side walls, as well as a door 3 which corresponds to the closure flap of the aforedescribed overhead baggage compartment. In trollies as well intermediate walls 1' can be provided. Handles (not illustrated) can be provided on the sides for handling and transport and rollers 4 can be provided on the underside.

In accordance with the invention the aforesaid bent respectively folded component 2 is a composite component, preferably a glass fibres or carbon fibre reinforced material and is preferably manufactured as a sandwich structure. In the preferred embodiment, for purposes of ease of manufacture and strength of the plastics container, the aforesaid composite component 2 is manufactured of prepregs 6 and comprises regions composed of honeycomb structural material 7 (see FIG. 3). The honeycomb structural materials which ensure the structural strength of the plastics container, for example conventional honeycomb materials, are preferably slightly spaced apart in order to permit the desired shaping of the composite component 2 during the manufacturing process.

For the connection of connecting components, for example fittings, hanger formations, support formations, fastening members for wheels or casters 4 to the basic body of the respective plastic container, it is possible to employ adhesive bonding, screw connecting, riveting or connecting these connection components by injection moulding simultaneously with or onto the composite component 2 or the end walls 1. Whereas the modifications of screw connecting and riveting provide connections which can better resist shear loading, an adhesive bonding or simultaneous or subsequent injection moulding provides the advantage that additional components and additional weight can be saved. The latter advantage also results if the closure flap 3 and the component 2 forming the side walls of the trolley or the surround of the baggage compartment are manufactured in one piece, a thin region of material being provided between this component 2 and the flap 3 or a gap between regions with honeycomb material 7 in order to provide movability of the closure flap 3 in relation to the component 2.

Two Preferred embodiments for the aforedescribed stowage containers will be described in the following in conjunction with FIGS. 3 and 4. The manufacuring processes of the containers are described, thereby explaining in detail the elements of the containers, their assembly and the final construction and features of the containers according to the present invention.

According to the first embodiment, it is provided that the plane end walls 1 and where applicable the intermediate walls are injection molded for which purpose preferably thermoplastic material is used and that the bent or folded composite component 2 and where applicable also the closure flap or door 3 are separately pre-manufactured.

Subsequently all components are interconnected by adhesive bonding, screwing, riveting or welding. The preferred embodiment and manufacturing method for the bent or folded component 2 is diagrammatically illustrated in FIG. 3. The closure flap or door 3 as well could be manufactured according to this manufacturing procedure if it is to be of bent or arcuate design. As illustrated a prepreg 6 is prepared wherein preferably regions of honeycomb structural materials 7 are provided which afford the required structural rigidity of the final component. This prepreg 6 is applied onto a negative mould 5, the configuration of which corresponds to the inner dimensions of the plastics container, gaps or regions of thinner material between the honeycomb material regions 7 serving to facilitate moulding the prepreg 6 about the negative mould 5. The prepreg 6 is fixed to the mould in a conventional manner, for example with the aid of a vacuum bag and is subsequently cured in an autoclave by heat application, optionally under pressure.

Instead of the separate manufacture of the composite component 2, including the curing thereof, a second manufacturing embodiment according to the invention provides that all components forming the plastics container are applied onto a mould 5 in a predetermined arrangement, are fixed in a conventional manner and are cured in an autoclave by heat application, optionally also with pressure. This modification is illustrated in FIG. 4a where it will be seen that the plane end walls 1 injection molded of thermoplastic material as well as the prepreg 6 for the composite component 2, once again advantageously involving the use of honeycomb materials 7 are applied onto the mould 5. The fixation of the components proceeds in a conventional manner, for example by a vacuum bag. After the curing in the autoclave the completed plastics container comprising the plane end walls 1, optionally intermediate walls (not illustrated) and the bent or folded composite component 2 are stripped in one piece off the mould and are subjected to finishing treatment, for example appropriate colouring.

In order to obviate the use of additional components the interconnection of the components proceeds exclusively by the adhesive bonding respectively welding together of the components resulting from the curing action.

Advantageously the components 1 which are preferably injection molded of thermoplastic material already have connecting members, such as, for example, fittings, brackets for the subsequent application to the aircraft body, and support means or trimmings applied thereto in the course of manufacture in the same procedure by injection moulding. Components serving for the interconnection of the components 2 and 3 may also already be provided on the bent component 2 and/or the closure flap 3. Thus, for example one part of a hinge can be applied to the component 2 or the closure flap 3 prior to the assembly and be provided with a connecting member to be fitted to the adjoining component. It is also possible to apply between certain connecting members, for example hinge members of the closure flap 3 and the bent component 2 an adhesive film, a liquid adhesive or the like in order to provide the interconnection of these components in the course of subsequent curing.

Figure 5A:
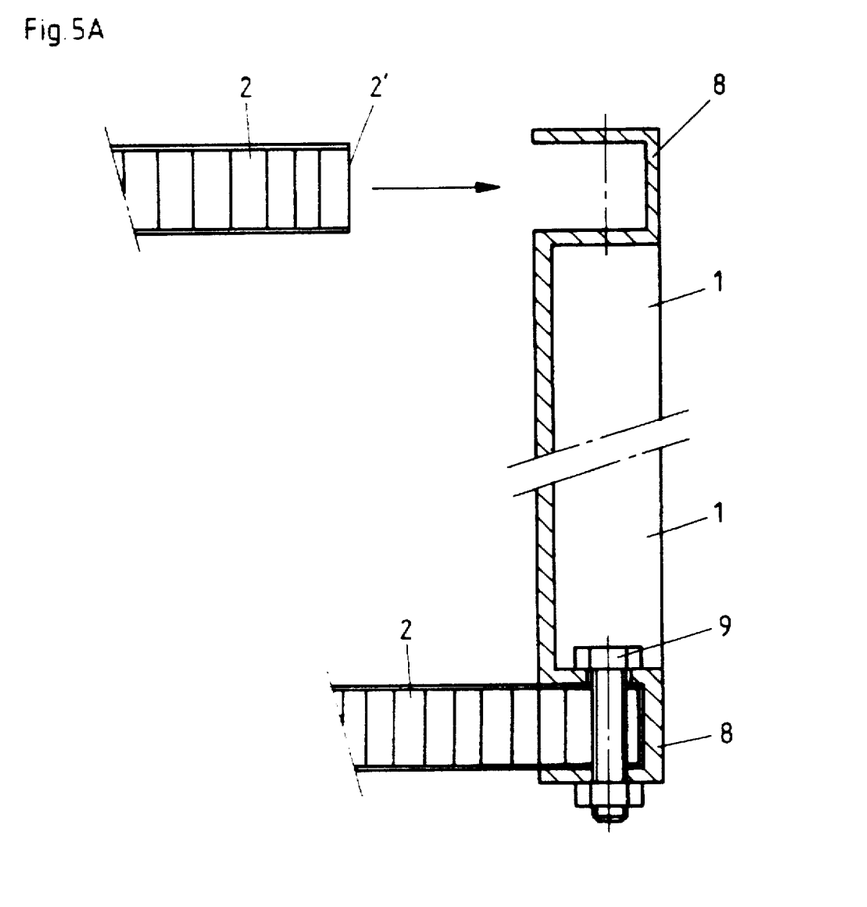
Figure 5B:
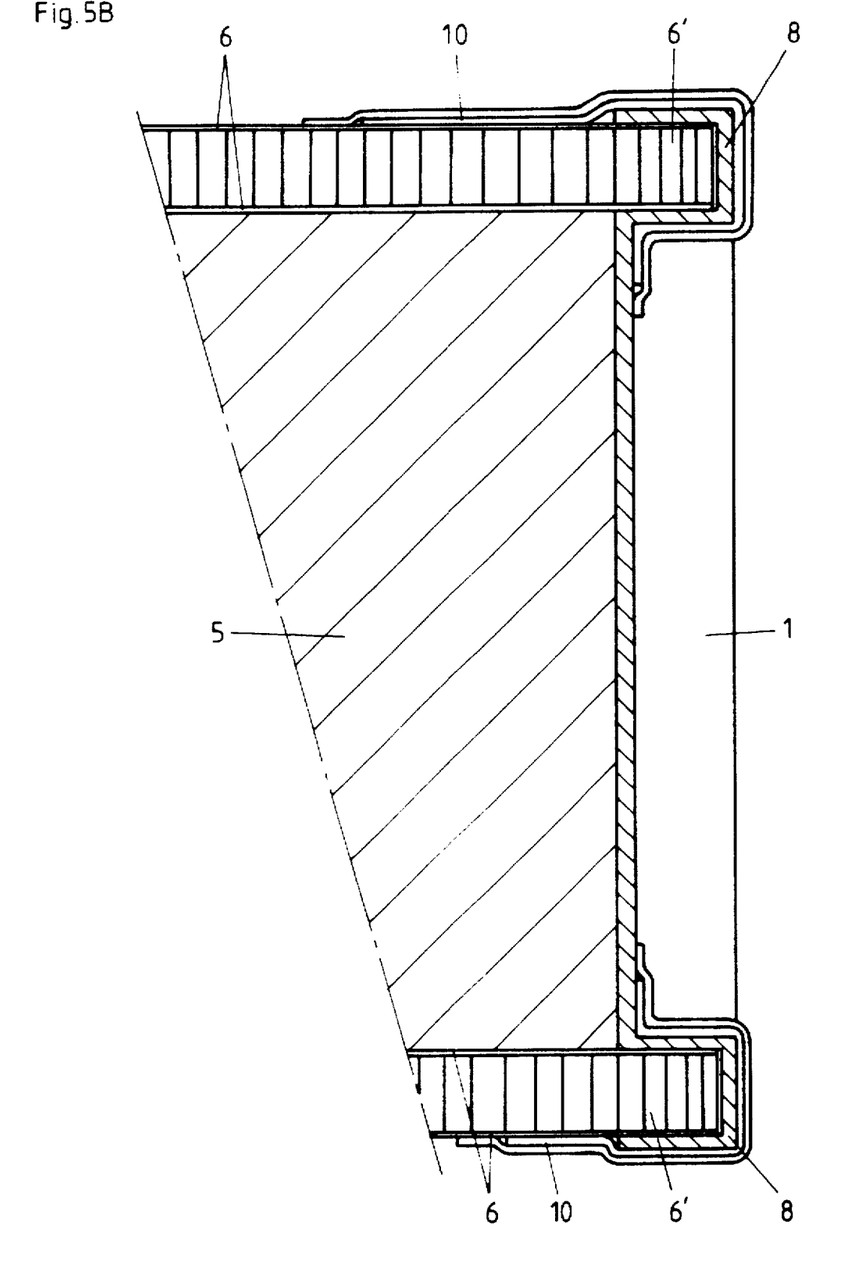

In conclusion the advantageous modifications illustrated in FIGS. 5a and 5b for the interconnection of the folded respectively bent component 2 to the plane end walls 1 are to be dealt with. In the upper half of FIG. 5a it is shown how a lateral edge 2' of the bent or folded composite component 2 is inserted into a U-shaped flange 8 on the outer edge of the plane end wall 1. If the components are appropriately designed this results in a kind of plug-in connection which adequately fixes the components 1, 2 brought together even prior to their final interconnection thereby substantially facilitating their further handling and processing. Thus, in the optimal case no additional fixing elements need, for example be used during the fitting onto a negative mould 5.

In the lower half of FIG. 5a a modification for the final connection of the end wall 1 to the composite component 2 is illustrated in which a screw, rivet or the like 9 takes care of the final connection. Such a connection is particularly load resistant, since the screw or rivet 9 is only subjected to shear loading. As can likewise be seen from FIG. 5a the aforesaid screw or rivet 9 passes through the flange 8 of the end wall 1 and the edge 2' of the composite component 2, parallel to the end wall 1, but outside of its plane and in particular outside the interior of the completed plastics container. Apart from the advantage that such a screw connection of three parallel successive layers can be produced easily, the interior of the plastics container can be kept free of projecting parts of the fastener elements used, for example the screw 9.

It stands to reason that, to obviate the screw, rivet or the like 9, a connection may also be brought about purely by adhesive or welding action in the modification illustrated in FIG. 5a as well. A particularly preferred working example of such a connection is illustrated in FIG. 5b. Here as well the plane end wall 1 is provided with U-shaped flanges 8 along its circumferential edge, these flanges 8 only accommodating the lateral edges 6' of the prepreg 6 for the component 2. Such prepreg 6 would then be applied onto the negative mould 5 prior to fitting the end wall, the respective dimensions being so selected that the side edges 6' project somewhat beyond the negative mould 5, so that the inner surface of the end walls 1 is in complete contact against the outer side wall of the mould 5 after the application and insertion of the side edges 6' into the flanges 8. In order to improve the stability and the connection between the end wall 1 and the prepreg 6, a further prepreg 10 is used which preferably prior to the curing of the components is layed over at least the region adjoining the side edges 6' of the prepreg 6 and the outside of the end walls 1, respectively, where applicable over the outside of the flanges 8 thereof and is cured jointly with the remaining components. In this context the prepreg 10 may be limited to the region which directly adjoins the side edges 6', a corresponding prepreg being likewise provided on the oppositely disposed side edge, or alternatively a prepreg 10 may be provided extending over the entire width of the prepreg 6. Any desired intermediate between the aforegoing possibilities may be employed.

The end wall 1 is firmly bonded between the side edges 6' of the prepreg 6 and the prepreg 10 by the joint curing action, and in this manner a secure connection is provided between the component 2 prepared from the prepreg 6 and the end walls 1.

Finally, it should be mentioned that obviously alternative forms of flanges 8 are also conceivable. In particular, in the processes employing a negative mould 5, in which the prepreg 6 respectively a pre-manufactured composite component 2 is supported, it is possible for the flange to be formed solely by a folded over part, directed towards the component 2 or the prepreg 6 and embracing the outside of the latter. As regards the mutual interconnection, the teachings of the preceding paragraphs apply.

Again a prepreg 6 is prepared wherein regions of honeycomb structural materials 7 are provided which afford the required structural rigidity of the final component. But now the prepreg 6 of FIG. 6 comprises parts which are designated to form the plane end wall members 1 of the final container.

Figure 6:
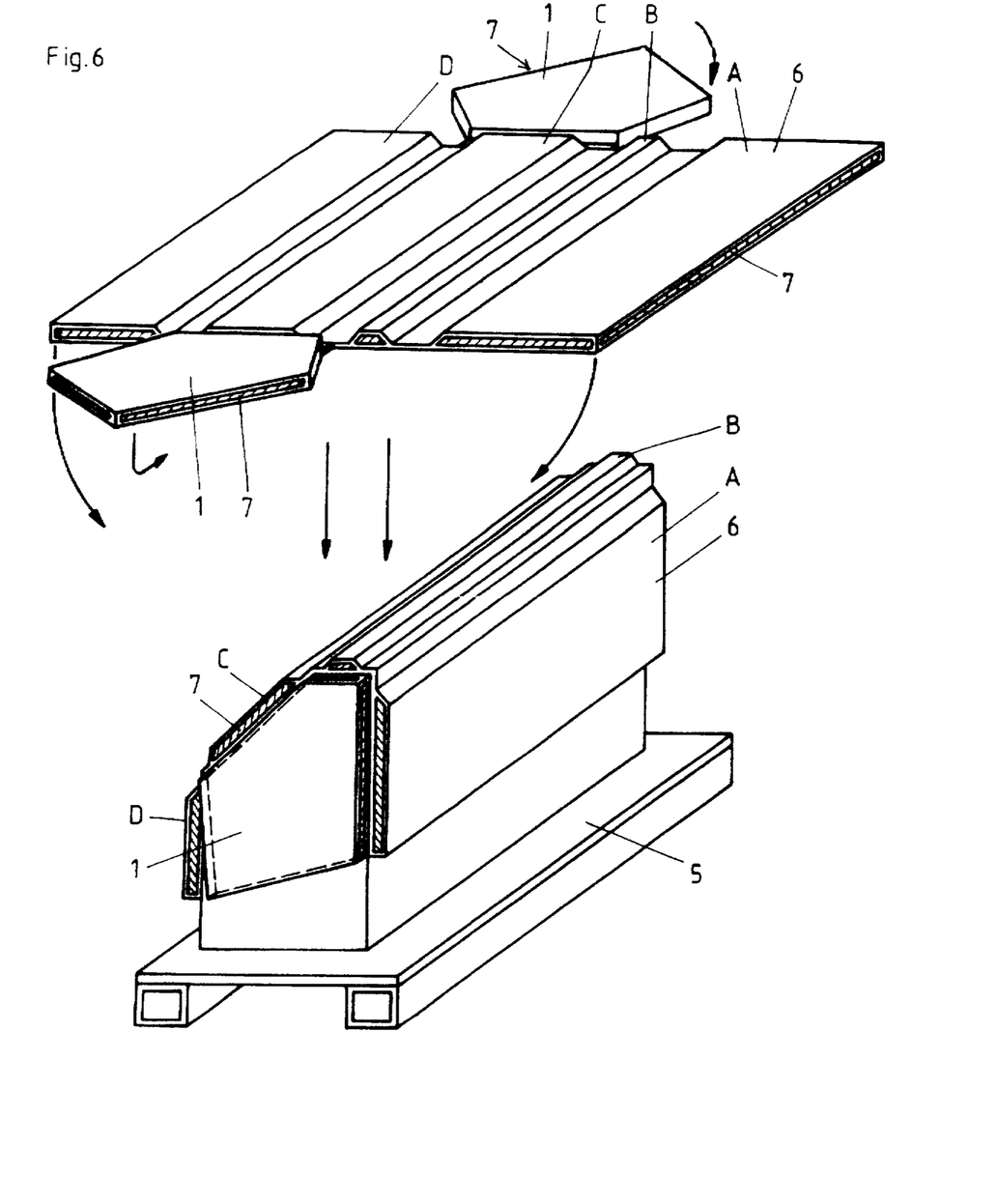

Said parts may also be provided with regions of honeycomb structural materials 7 to give them the required rigidity and said regions are preferably spaced apart from all other regions of honeycomb materials to permit the desired shaping of the component during the following manufacturing steps.

Figure 3:
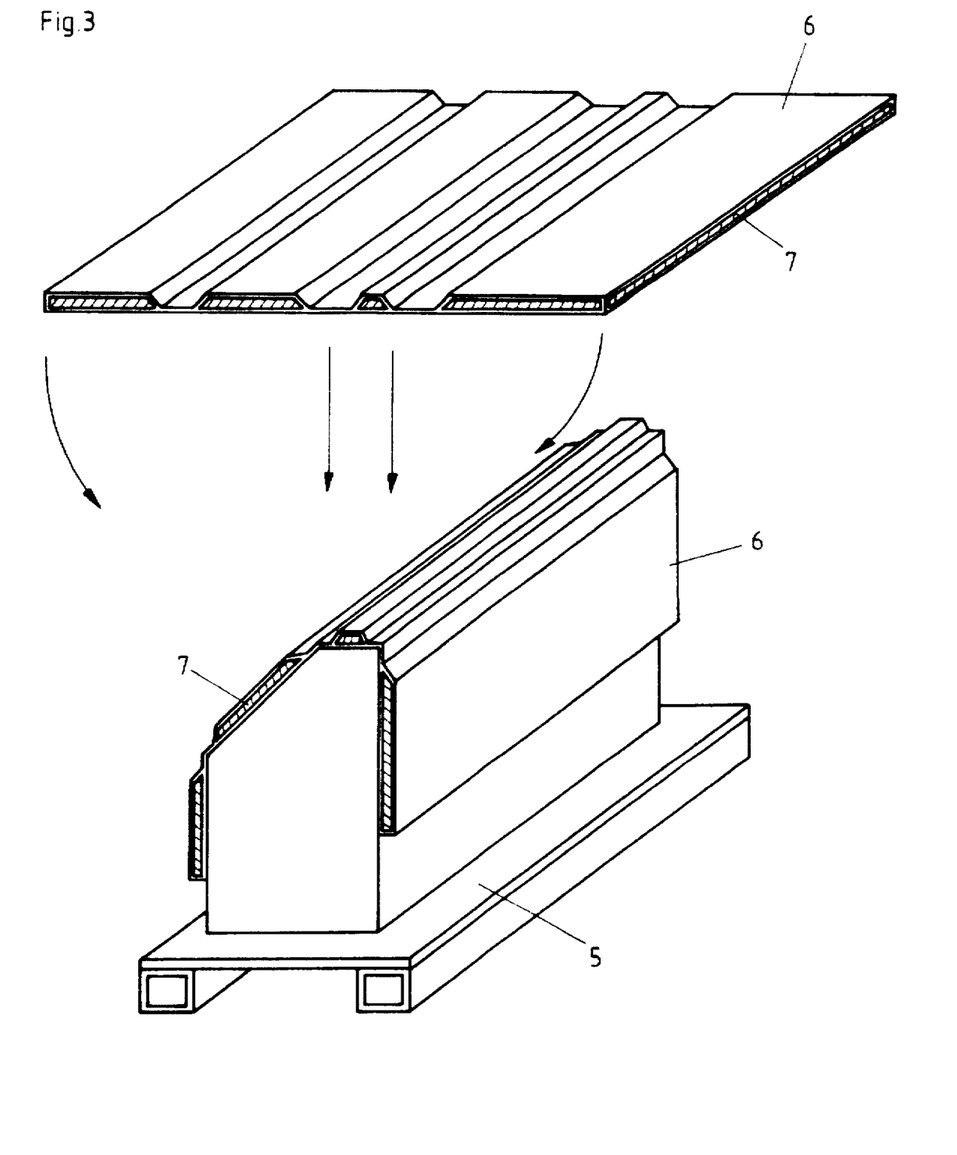
FIG. 3 a diagrammatic view of a prepreg for the bent or folded component and the application thereof onto a mould, FIG. 4a a diagrammatic view of the condition prior to the application of pre-manufactured components onto a mould, FIG. 4b the removal of the assembled fully cured plastics stowage container, FIG. 5a and 5b, cross-sectional views for advantageous embodiments for interconnecting the components of the container according to the invention, FIG. 6 a diagrammatic view of single a prepreg for the bent or folded component as well as for the plane end wall members and the application thereof onto a mould, and FIG. 7 the removal of the assembled fully cured plastics stowage container made of the single prepreg according FIG. 6.

The prepreg 6 is applied to a mould 5 as already described in FIG. 3 under bending or folding of the prepreg including the parts thereof forming the plane end wall members 1.

Figure 4A:
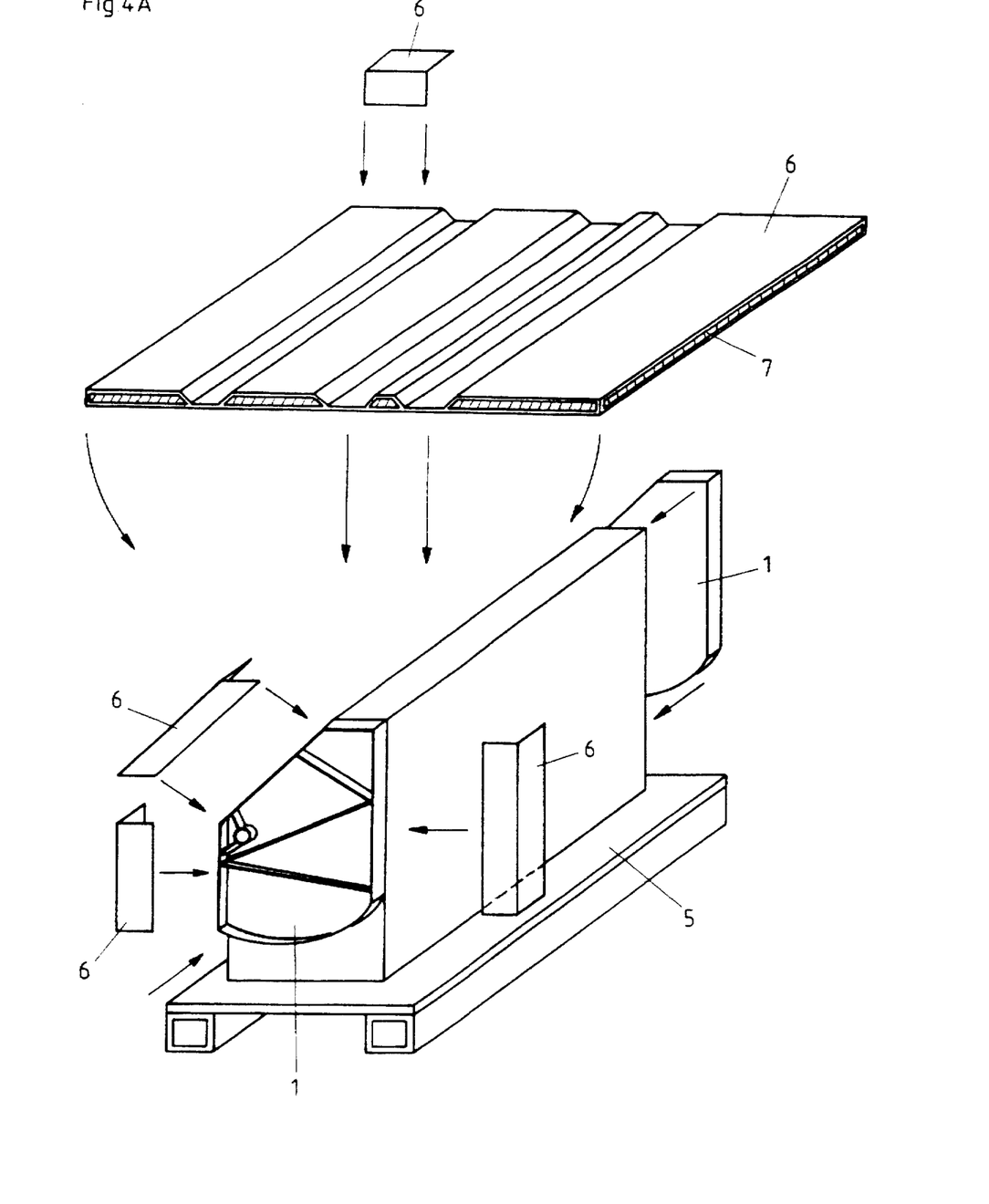
Figure 4B:
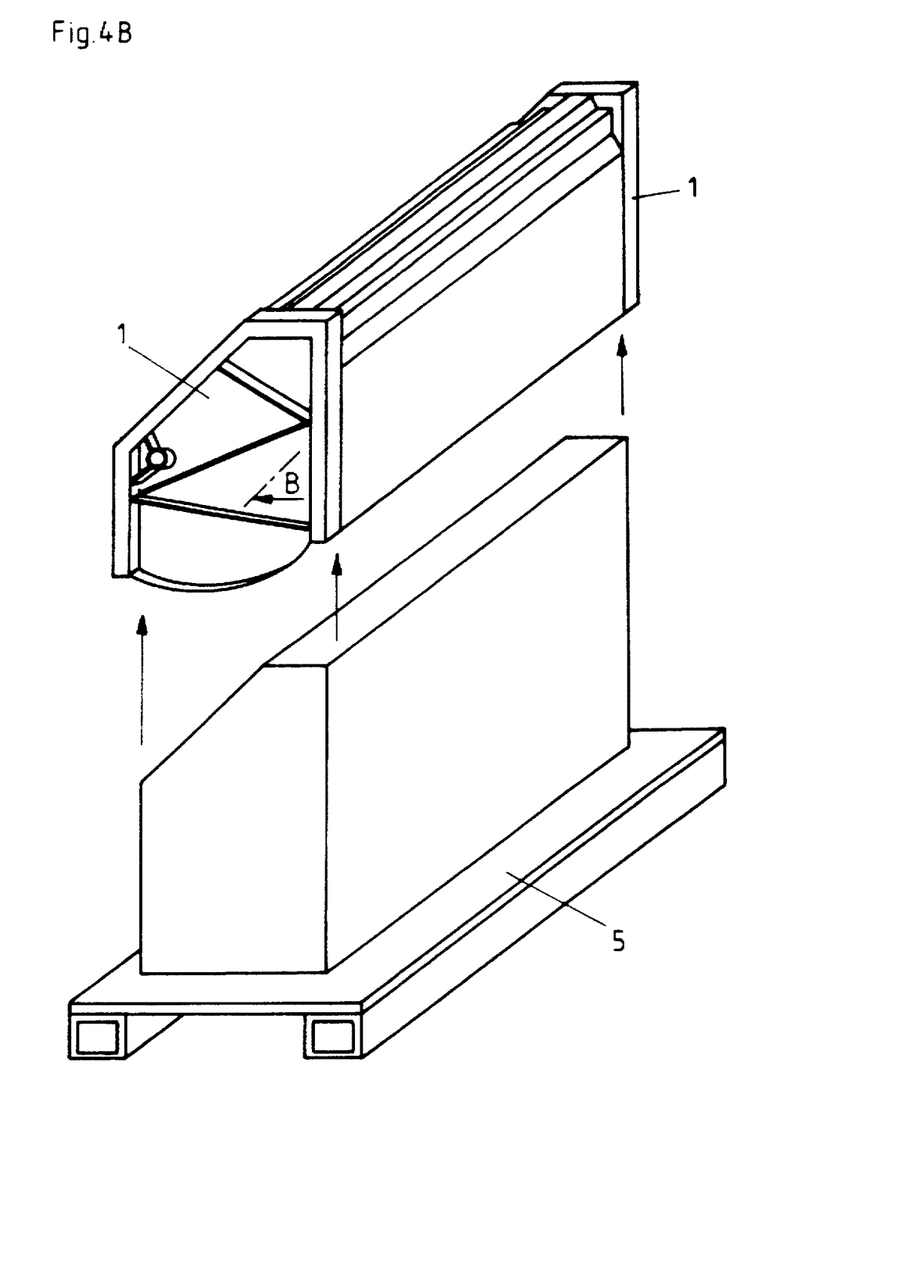
Figure 7:
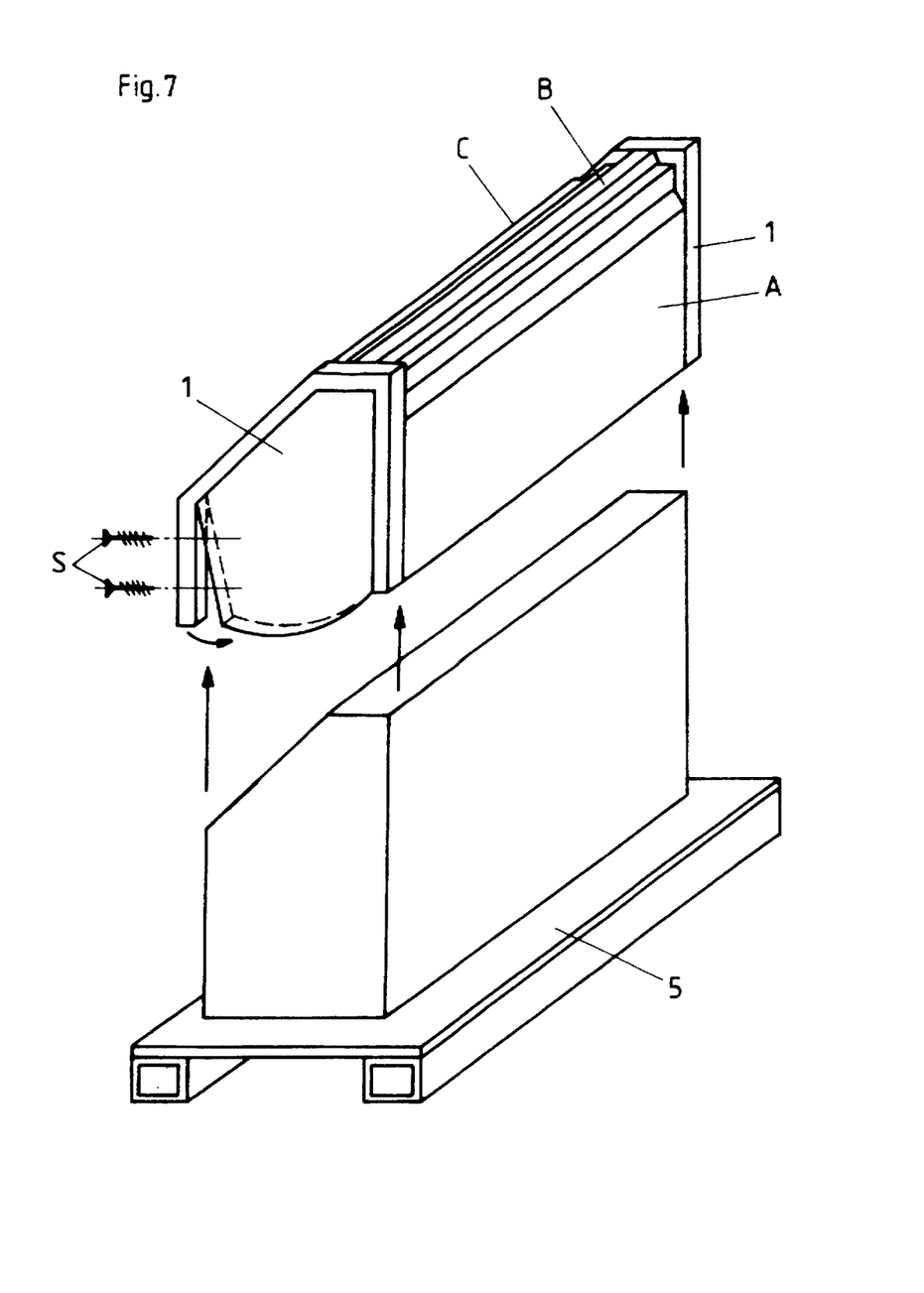

After curing the prepreg 6 to the rigid, strong and lightweight single piece component 2 in a process as aforedescribed in conjunction with FIGS. 3 and 4 said component 2 is removed from the mould 5 in a state as shown in FIG. 7.

In embodiments where the container has less width at its open end than on the opposite closed end a variation of the described single-piece construction is used. The container is cured in a manner that one of the wall members is not connected fixedly with all of the adjacent wall members, such that the container opens up in the direction towards its open end and for this reason the cured composite component 2 can easily be removed from the mould 5—as depicted in FIG. 7. In the shown embodiment, for example, a gap remains between the top wall member D and the adjacent plane end wall members 1, which gap gets smaller from the open end—later on closed by the closure flap member 3—of the container towards the connection region of the top wall member D and the adjacent side wall members 1. Even after curing the "free-ending" wall member D can be bent or folded a small angle towards the adjacent wall members and is then connected with said wall members by any appropriate known manner. Preferably connecting elements such as screws or adhesive bonding for connecting the wall members to bring the container into its final form is provided, and reinforcing layers of fibre reinforced strips may be provided at the connecting regions.

I claim:

1. A stowage container for use in an aircraft, the container comprising an essentially rigid U-shaped surround member, two essentially rigid and flat end wall members, and an essentially rigid closure flap, the end wall members being made of injection-molded parts, a cured composite component forming in one single piece the U-shaped surround member, the component being manufactured of prepregs of fiber-reinforced thermoplastic material in sandwich construction with regions of honeycomb construction material interposed between at least two layers of prepregs, the component having intermediate regions of reduced thickness between the regions of honeycomb construction material, the component being bent at the intermediate regions to form the U-shaped surround member of the container, wherein the end wall member has a U-shaped flange, the flange forming a U-shaped recess with two parallel sides for receiving a portion of the component, the portion having the region of honeycomb construction material interposed between the two layers of prepregs, and wherein a fastening means passes through the two parallel sides of the recess, through the honeycomb construction material, and through the two layers of prepregs to connect the component to the end wall member.

2. A container as claimed in claim 1 wherein the composite component is made of glass fiber reinforced plastic material.

3. A container as claimed in claim 1 wherein the composite component is made of carbon fiber reinforced plastic material.

4. A container as claimed in claim 1 wherein the end walls are made of thermoplastic material.

5. A container as claimed in claim 1 wherein the closure flap is fitted to the composite components by means of hinges.

6. A container as claimed in claim 5 wherein the closure flap is an injection-molded part, preferably made of thermoplastic material.

7. A container as claimed in claim 5 wherein the closure flap is a die-cast part.

8. A container as claimed in claim 1 comprising additionally at least one intermediate plane wall member of injection-molded parts between the end wall members.

9. A container as claimed in claim 8 wherein the composite component is made of glass fiber reinforced plastic material.

10. A container as claimed in claim 8 wherein the composite component is made of carbon fiber reinforced plastic material.

11. A container as claimed in claim 8 wherein the intermediate plane wall member is made of thermoplastic material.

12. A container as claimed in claim 11 wherein the composite component is made of glass fiber reinforced plastic material.

13. A container as claimed in claim 11 wherein the composite component is made of carbon fiber reinforced plastic material.

14. A container as claimed in claim 1 wherein the container is an overhead baggage compartment.

15. A container as claimed in claim 1 in form of a trolley.

16. A container as claimed in claim 1, wherein the container defines an interior stowage space and the fastening means is outside of the interior stowage space.

17. An overhead stowage container within an aircraft, the container comprising an essentially rigid U-shaped surround member, two essentially rigid and flat end wall members, and an essentially rigid closure flap, the end wall members being made of injection-molded parts, a cured composite component forming in one single piece the U-shaped surround member, the component being manufactured of prepregs of fiber-reinforced thermoplastic material in sandwich construction with regions of honeycomb construction material interposed between at least two layers of prepregs, the component having intermediate regions of reduced thickness between the regions of honeycomb construction material, the component being bent at the intermediate regions to form the U-shaped surround member of the container, wherein the end wall member has a U-shaped flange, the flange forming a U-shaped recess with two parallel sides for receiving a portion of the component, the portion having the region of honeycomb construction material interposed between the two layers of prepregs, and wherein a fastening means passes through the two parallel sides of the recess, through the honeycomb construction material, and through the two layers of prepregs to connect the component to the end wall member.

18. A container as claimed in claim 17 wherein the composite component is made of glass fiber reinforced plastic material.

19. A container as claimed in claim 17 wherein the composite component is made of carbon fiber reinforced plastic material.

20. A container as claimed in claim 17 wherein the end wall members are made of thermoplastic material.

21. A container as claimed in claim 17 wherein the closure flap is fitted to the composite component by means of hinges.

22. A container as claimed in claim 21 wherein the closure flap is an injection-molded part, preferably made of thermoplastic material.

23. A container as claimed in claim 21 wherein the closure flap is a die-cast part.

24. A container as claimed in claim 17 comprising additionally at least one intermediate plane wall member of injection-molded parts between the end wall members.

25. A container as claimed in claim 24 wherein the intermeiate wall member is made of thermoplasic material.

26. A container as claimed in claim 17, wherein the container defines an interior stowage space and the fastening means is outside of the interior stowage space.

27. A stowage container for use in an aircraft, the container comprising a bottom member, a top member, at least two side wall members, and two end wall members, the members being essentially rigid and flat, the container further comprising an essentially rigid closure flap, the end wall members being made of injection-molded parts, a cured composite component forming in one single piece the bottom member, the top member, and the side wall members, the component being manufactured of prepregs of fiber-reinforced thermoplastic material in sandwich construction with regions of honeycomb construction material interposed between at least two layers of prepregs, the component having intermediate regions of reduced thickness between the regions of honeycomb construction material, the component being folded at the intermediate regions to form the bottom, top, and side wall members of the container, wherein the end wall member has a U-shaped flange, the flange forming a U-shaped recess with two parallel sides for receiving a portion of the component, the portion having the region of honeycomb construction material interposed between the two layers of prepregs, and wherein a fastening means passes through the two parallel sides of the recess, through the honeycomb construction material, and through the two layers of prepregs to connect the component to the end wall member.

28. A container as claimed in claim 27 wherein the composite component is made of glass fiber reinforced plastic material.

29. A container as claimed in claim 27 wherein the composite component is made of carbon fiber reinforced plastic material.

30. A container as claimed in claim 27 wherein the end wall members are made of thermoplastic material.

31. A container as claimed in claim 27 wherein the closure flap is fitted to the composite component by means of hinges.

32. A container as claimed in claim 31 wherein the closure flap is an injection-molded part, preferably made of thermoplastic material.

33. A container as claimed in claim 31 wherein the closure flap is a die-cast part.

34. A container as claimed in claim 27 comprising additionally at least one intermediate plane wall member of injection-molded parts between the end wall members.

35. A container as claimed in claim 34 wherein the intermediate plane wall member is made of thermoplastic material.

36. A container as claimed in claim 34 wherein the composite component is made of glass fiber reinforced plastic material.

37. A container as claimed in claim 34 wherein the composite component is made of carbon fiber reinforced plastic material.

38. A container as claimed in claim 27, wherein the container is an overhead baggage compartment.

39. A container as claimed in claim 27 in form of a trolley.

40. A container as claimed in claim 27, wherein the container defines an interior stowage space and the fastening means is outside of the interior stowage space.

41. An overhead stowage container within an aircraft, the container comprising a bottom member, a top member, at least two side wall members, and two end wall members, the members being essentially rigid and flat, the container further comprising an essentially rigid closure flap, the end wall members being made of injection-molded parts, a cured composite component forming in one single piece the bottom member, the top member, and the side wall members, the component being manufactured of prepregs of fiber-reinforced thermoplastic material in sandwich construction with regions of honeycomb construction material interposed between at least two layers of prepregs, the component having intermediate regions of reduced thickness between the regions of honeycomb construction material, the component being folded at the intermediate regions to form the bottom, top, and side wall members of the container, wherein the end wall member has a U-shaped flange, the flange forming a U-shaped recess with two parallel sides for receiving a portion of the component, the portion having the region of honeycomb construction material interposed between the two layers of prepregs, and wherein a fastening means passes through the two parallel sides of the recess, through the honeycomb construction material, and through the two layers of prepregs to connect the component to the end wall member.

42. A container as claimed in claim 41 wherein the composite component is made of glass fiber reinforced plastic material.

43. A container as claimed in claim 41 wherein the composite component is made of carbon fiber reinforced plastic material.

44. A container as claimed in claim 41 wherein the end wall members are made of thermoplastic material.

45. A container as claimed in claim 41 wherein the closure flap is fitted to the composite component by means of hinges.

46. A container as claimed in claim 45 wherein the closure flap is an injection-molded part, preferably made of thermoplastic material.

47. A container as claimed in claim 45 wherein the closure flap is a die-cast part.

48. A container as claimed in claim 41 comprising additionally at least one intermediate plane wall member of injection-molded parts between the end wall members.

49. A container as claimed in claim 48 wherein the intermediate wall member is made of thermoplastic material.

50. A container as claimed in claim 41, wherein the container defines an interior stowage space and the fastening means is outside of the interior stowage space.

* * * * *